United States Patent [19]

Aumont

[11] 3,997,110
[45] Dec. 14, 1976

[54] ANTI-SLIPPING ACCESSORY FOR TRACTION WHEEL

[76] Inventor: Yves Aumont, 5243-4th Ave., Rosemont, Quebec H1Y 2V4, Canada

[22] Filed: Apr. 28, 1975

[21] Appl. No.: 571,914

[30] Foreign Application Priority Data

May 27, 1974 Canada .................. 200912

[52] U.S. Cl. .................. 238/14
[51] Int. Cl.² .................. E01B 23/00
[58] Field of Search ........ 238/14; 152/208, 213 R, 152/221, 222, 223, 224, 225–230; 301/38 R, 41 R, 44 T

[56] References Cited

UNITED STATES PATENTS

| | | | |
|---|---|---|---|
| 1,375,666 | 4/1921 | Bauer | 238/14 |
| 2,680,567 | 6/1954 | Steven | 238/14 |
| 3,425,624 | 2/1969 | Jacobs | 238/14 |

FOREIGN PATENTS OR APPLICATIONS

| | | | |
|---|---|---|---|
| 25,482 | 2/1915 | Norway | 238/14 |

Primary Examiner—Stanley H. Tollberg
Assistant Examiner—Hadd Lane

[57] ABSTRACT

An accessory adapted to be wedged under a traction wheel of a vehicle to allow production of traction upon rotation of that wheel. This anti-slipping accessory is characterized by cleats laterally offset from each other transversely of the accessory to preserve the tractive efficiency even though the supporting surface has been plowed by the cleats; and also, by having a leading end allowing convenient wedging under a roadwheel and gripping of its tire. This accessory includes two converging strips of bendable material, crossbars extending transversely of these strips and simply secured thereto, cleats projecting endwise from one face of these strips and laterally offset from each other transversely of the strips, a crossbar at the leading end adapted to engage notches of the tire of the roadwheel, a crossbar at the trailing end adapted to minimize throwing of the accessory, and advantageous securement of each cleat to both the corresponding crossbar and the corresponding strip.

1 Claim, 5 Drawing Figures

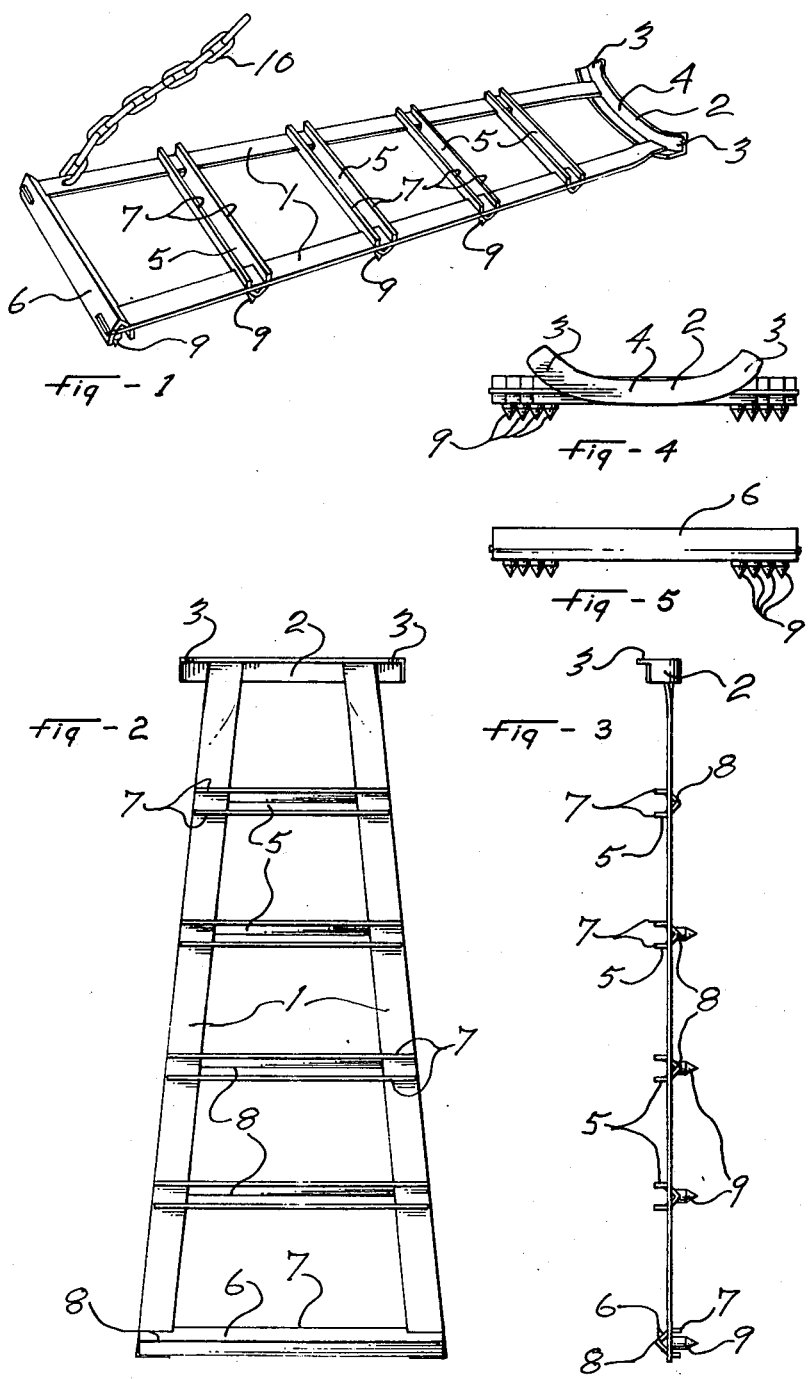

ANTI-SLIPPING ACCESSORY FOR TRACTION WHEEL

This invention relates to an accessory to prevent slipping of a traction wheel of a vehicle, such as on ice, in the snow, in a hole or the like, and more particularly, this invention relates to an accessory of the type adapted to be wedged under a traction wheel to produce traction upon rotation of the latter.

Numerous embodiments of such accessories have been anteriorly proposed with varying degrees of success. In order to achieve the expected performance, such accessory has to provide good gripping with both the supporting surface and the tire or wheel and also has to be conveniently wedgeable under a traction wheel. It is found that none of the prior art accessories of the above type is fully satisfactory in all of these three counts. For instance, it has been noted that the anteriorly proposed cleats lose some of their effectiveness if there happens any slipping of the accessory relative to the supporting surface, since some then ineffectively engage into a plowed surface.

It is a general object of the present invention to provide an anti-slipping accessory of the above type, which provides good gripping with both the supporting surface and the tire of a traction wheel and which is conveniently wedgeable under the latter irrespective of the ground condition which calls for its use.

It is a more specific object of the present invention to provide an anti-slipping accessory of the above type which provides improved gripping with the ground and wherein the cleats retain their efficiency by not normally engaging into any plowed surface produced by any preceding cleat.

It is another more specific object of the present invention to provide an anti-slipping accessory of the above type which has a leading end particularly adapted to be wedged under a roadwheel and to firmly grip notches of the tire thereof and which is adapted to minimize the throwing action of the traction wheel thereon and which is relatively simple to make despite the composite construction thereof.

The above and other objects and advantages of the present invention will be better understood in the light of the following detailed description of a preferred embodiment thereof which is illustrated, by way of example, in the accompanying drawings, wherein:

FIG. 1 is a perspective view of the anti-slipping accessory of the present invention;

FIG. 2 is a top plan view of the accessory of FIG. 1;

FIG. 3 is a side elevation of the accessory as seen from the righthand side of FIG. 2;

FIG. 4 is a front end elevation of the accessory; and

FIG. 5 is a rear end elevation of the accessory.

The illustrated anti-slipping accessory includes a pair of strips 1, made of flexible or bendable material and which converge towards one end of the accessory, namely the front end. The strips 1 are made, for example, of pliable metal. The strips 1 operatively form a support defining a lower face, an upper face and a longitudinal axis extending in the direction of the regular wheel path. A rigid crossbar 2 is secured to the ends of strips 1 which are closer together and consist of an angular iron shaped to form protuberances 3 at its opposite ends, adapted to hook into the conventional notches, or cavities, at both sides of the tread of a conventional tire, not shown. The terminal crossbar 2 defines a first flange in the general plane of the strips 1 and a second flange extending upwardly. The end portions of the crossbar 2 protrude laterally from the respective strips 1 and are curved upwardly so that the second flange forms a concave upper edge and the protuberances 3 are disposed outwardly of the two strips 1 relative to the central portion 4 of the crossbar which is located between the strips 1.

A series of additional crossbars 5 are secured transversely to the strips 1 and are laterally spaced from one another. A further crossbar 6 is also secured transversely to strips 1 at the ends of said strips opposite to the ends to which terminal crossbar 2 is secured. Crossbars 5 and 6 are preferably of decreasing length, starting from crossbar 6 towards crossbar 2, their ends preferably terminating at the outer edge of the strips 1. Each of the crossbars 5 and 6 is rigid, straight and has a V-shaped cross-section defining a pair of diverging wings with an intermediate sharp edge apex 8 and a pair of parallel flanges 7 extending from the free edge of the wings.

The lateral flanges 7 of crossbar 5 are located above strips 1 and point away from the upper face of these strips 1. The sharp edges 8 of the crossbars 5 are positioned underneath the strips 1 and protrude away from the underface of said strips 1. Thus, the lateral flanges 7 of the crossbars 5 form a means to frictionally engage the tread of the tire, helping in the traction, whereas sharp edges 8 of the same crossbars form traction bars engaging the supporting surface to prevent slipping with respect to said surface.

In the case of the crossbar 6, the latter is inverted with respect to crossbars 5 whereby its lateral edges 7 and its intermediate sharp edge 8 are relatively disposed underneath and above the strips 1. In this way, the sharp edge 8 of crossbar 6 is adapted to grip with the tire tread, and when the traction wheel leaves the accessory, the possibility of the latter being thrown away from the wheel, is reduced to a minimum.

Each end of the crossbars 5 and 6 is provided with a slit disposed at a level intermediate the sharp edge 8 and the lateral flanges 7 and each strip 1 is simply inserted within the slits at the corresponding ends of the crossbars 5 and 6.

A cleat 9, of pointed shape, is secured at each end of each crossbars 5 and 6 with the exception of the crossbar 5 which is immediately adjacent the front terminal crossbar 2. The cleats 9 are aligned in two converging rows located underneath the respective strips 1 and, consequently, are also converging. In other words, the cleats are aligned exclusively in transverse series relative to the longitudinal axis. The cleats 9 are thus laterally offset one with respect to the other transversely of strips 1 and of the accessory, as illustrated in FIGS. 4 and 5. Consequently, if slipping of the accessory occurs with consequent plowing of the supporting surface by the cleats 9, none of the cleats becomes non-efficient, because it cannot follow the plowing trace made by the preceding cleat.

Cleats 9 of crossbars 5 extend through a hole made in the latter, being secured to said crossbars and also to the corresponding strip 1. In a similar manner, the cleats of crossbar 6 extend through holes of strips 1 and are secured to the crossbar 6. Thus, the cleats 9 serve also as a means to secure the crossbars 5 and 6 to the strips 1.

A chain 10 is attached to the accessory, preferably at the rear end of the latter, and serves to retrieve the accessory after use, the latter normally being then covered by material thrown away by the traction wheel, such as snow, mud and the like.

The accessory in accordance with the invention is used by inserting or wedging its narrower front part in the rut underneath that wheel of the motor vehicle which is slipping. This wedging is possible by pressing on the cross rods 5, which causes bending of the strips 1, such as to present the protuberances 3 of the terminal front crossbar 2 in proper position to engage the side notches of the tire tread.

I claim:

1. As an anti-slipping accessory for engaging between a powered tire wheel of a vehicle and a supporting surface, comprising a pair of converging flat bendable strips having an upper face and an underface, a plurality of rigid elongated straight parallel crossbars, each of V-shape cross-section, having an apex longitudinal edge and a pair of diverging wings, and further including a pair of parallel longitudinal flanges extending from the free edges of said wings, said crossbars secured at both ends to the respective strips, substantially equally spaced from one another along said strips, both ends of each crossbar having a slit opening at said end and extending towards the other end of the crossbars, said strip inserted within said slits, pointed cleats secured to all intersecting portions of said crossbars and strips and securing said crossbars to said strips, said cleats projecting from the underface of said strips and of said crossbars to penetrate the supporting surface, said crossbars including an outermost crossbar joining the ends of said strips which are farthest apart and an innermost crossbar, all of said crossbars, except said outermost crossbar, having their apex longitudinal edge downwardly directed, said outermost crossbar being reversed relative to the other crossbars and having its apex longitudinal edge upwardly directed, said innermost crossbar joining portions of said strips spaced from the ends of said strips which are closest apart, and a terminal crossbar, of L-shape cross-section, joining and secured to the ends of said strips which are closest apart, said terminal crossbar having a first flange disposed in the general plane of said strips and a second flange extending upwardly, the end portions of said terminal crossbar protruding laterally from said strips and curved upwardly so that the upwardly curved portions of said second flange will engage the side notches of the tread of the tire of said wheel, movement of said wheel over the central portion of said intermediate crossbars causing their apex longitudinal edges and the associated cleats to engage said supporting surface, the unevenness of said surface being allowed for by the bending of said bendable strips.

* * * * *